(12) United States Patent
Raval et al.

(10) Patent No.: US 9,270,171 B2
(45) Date of Patent: Feb. 23, 2016

(54) METHODS AND APPARATUS FOR DC-DC CONVERTER HAVING DITHERED SLOPE COMPENSATION

(71) Applicant: ALLEGRO MICROSYSTEMS, LLC, Worcester, MA (US)

(72) Inventors: Pranav Raval, Nashua, NH (US); Gregory Szczeszynski, Hollis, NH (US); George Humphrey, Merrimack, NH (US)

(73) Assignee: ALLEGRO MICROSYSTEMS, LLC, Worcester, MA (US)

( * ) Notice: Subject to any disclaimer, the term of this patent is extended or adjusted under 35 U.S.C. 154(b) by 79 days.

(21) Appl. No.: 13/834,119

(22) Filed: Mar. 15, 2013

(65) Prior Publication Data

US 2014/0055115 A1   Feb. 27, 2014

Related U.S. Application Data

(60) Provisional application No. 61/691,854, filed on Aug. 22, 2012.

(51) Int. Cl.
*H02M 3/156* (2006.01)
(52) U.S. Cl.
CPC ..................................... *H02M 3/156* (2013.01)
(58) Field of Classification Search
CPC .......... H02M 1/32; H02M 2001/0025; H02M 2001/0032; G05F 1/10
USPC .................. 323/222–225, 271–275, 282–288
See application file for complete search history.

(56) References Cited

U.S. PATENT DOCUMENTS

| | | | | |
|---|---|---|---|---|
| 6,028,491 A * | 2/2000 | Stanchak et al. | ................. | 331/75 |
| 6,088,243 A * | 7/2000 | Shin | ............................. | 363/21.05 |
| 6,404,251 B1 * | 6/2002 | Dwelley et al. | ................. | 327/172 |
| 6,465,993 B1 * | 10/2002 | Clarkin et al. | ................. | 323/272 |
| 7,005,836 B1 * | 2/2006 | Rice | ................................. | 323/288 |
| 7,570,037 B2 * | 8/2009 | Li et al. | ........................... | 323/283 |
| 8,288,953 B1 * | 10/2012 | Mei | ............................ | 315/209 R |
| 8,860,329 B2 * | 10/2014 | Wang | ............................. | 315/297 |
| 2002/0008501 A1 * | 1/2002 | Telefus et al. | ................... | 323/282 |
| 2003/0222627 A1 * | 12/2003 | Hwang | ............................ | 323/222 |
| 2004/0095115 A1 * | 5/2004 | Kernahan et al. | ............... | 323/282 |
| 2006/0043952 A1 * | 3/2006 | Huang | ............................ | 323/282 |
| 2007/0108947 A1 * | 5/2007 | Liao | ................................. | 323/222 |
| 2007/0252567 A1 * | 11/2007 | Dearn et al. | ................... | 323/282 |
| 2007/0273340 A1 * | 11/2007 | Miller et al. | ................... | 323/224 |
| 2008/0164828 A1 * | 7/2008 | Szczeszynski et al. | ........ | 315/300 |
| 2008/0252279 A1 * | 10/2008 | Wang | ............................. | 323/283 |
| 2009/0128112 A1 * | 5/2009 | Xu et al. | ......................... | 323/282 |
| 2009/0174379 A1 * | 7/2009 | Lima et al. | ..................... | 323/282 |

(Continued)

*Primary Examiner* — Timothy J Dole
*Assistant Examiner* — Yusef Ahmed
(74) *Attorney, Agent, or Firm* — Daly, Crowley Mofford & Durkee, LLP

(57) ABSTRACT

Methods and apparatus for a circuit including a DC-DC converter including: a boost converter to provide a DC voltage output from a DC input voltage, the DC output voltage configured to connect with a first load terminal, a feedback module configured to connect with a second load terminal, a switching module having a switching element coupled to the boost converter, and a control circuit coupled to the switching module to control operation of the switching element, the control circuit coupled to the feedback module, wherein the control circuit includes a slope generator to generate a ramp signal having a slope that can vary cycle to cycle.

21 Claims, 4 Drawing Sheets

(56) References Cited

U.S. PATENT DOCUMENTS

| | | | |
|---|---|---|---|
| 2009/0237053 A1* | 9/2009 | Gan | 323/283 |
| 2009/0302776 A1* | 12/2009 | Szczeszynski | 315/246 |
| 2010/0001706 A1* | 1/2010 | Nguyen | 323/288 |
| 2010/0072922 A1* | 3/2010 | Szczeszynski et al. | 315/297 |
| 2010/0102788 A1* | 4/2010 | Kuroyabu et al. | 323/282 |
| 2010/0237845 A1* | 9/2010 | Scaldaferri et al. | 323/299 |
| 2010/0253313 A1* | 10/2010 | Herzer et al. | 323/312 |
| 2010/0277088 A1* | 11/2010 | Bodano | 315/283 |
| 2010/0289424 A1* | 11/2010 | Chang et al. | 315/250 |
| 2010/0301827 A1* | 12/2010 | Chen et al. | 323/299 |
| 2011/0062932 A1* | 3/2011 | Hawkes | 323/288 |
| 2011/0163785 A1* | 7/2011 | Chen et al. | 327/144 |
| 2011/0205764 A1* | 8/2011 | Sheng et al. | 363/21.09 |
| 2011/0215782 A1* | 9/2011 | Cheng | 323/284 |
| 2011/0279060 A1* | 11/2011 | Wang | 315/297 |
| 2011/0316508 A1* | 12/2011 | Cheng et al. | 323/282 |
| 2012/0153922 A1* | 6/2012 | Chen et al. | 323/288 |
| 2012/0161728 A1* | 6/2012 | Chen et al. | 323/271 |
| 2012/0176824 A1* | 7/2012 | Franklin et al. | 363/79 |
| 2012/0212197 A1* | 8/2012 | Fayed et al. | 323/271 |
| 2012/0250378 A1* | 10/2012 | Kok et al. | 363/78 |
| 2012/0274228 A1* | 11/2012 | Szczeszynski | 315/224 |
| 2012/0300499 A1* | 11/2012 | Chang et al. | 363/16 |
| 2013/0163300 A1* | 6/2013 | Zhao et al. | 363/89 |
| 2013/0207632 A1* | 8/2013 | Thandi et al. | 323/288 |
| 2013/0294118 A1* | 11/2013 | So et al. | 363/21.16 |
| 2014/0002042 A1* | 1/2014 | Wismar et al. | 323/282 |
| 2014/0029315 A1* | 1/2014 | Zhang et al. | 363/21.13 |

* cited by examiner

METHODS AND APPARATUS FOR DC-DC CONVERTER HAVING DITHERED SLOPE COMPENSATION

CROSS REFERENCE TO RELATED APPLICATIONS

The present application claims the benefit of U.S. Provisional Patent Application No. 61/691,854, filed on Aug. 22, 2012, which is incorporated herein by reference.

BACKGROUND

As is known in the art, Electro-Magnetic Emission (EMI) compliance rules dictate the maximum amount of power a device is allowed to radiate at a particular frequency. In order to meet these requirements, a common technique employed is to spread the transmitted power over a frequency range in order to prevent the power from concentrating at a particular frequency.

FIG. 1 shows a conventional DC-DC converter 10 including a boost circuit 12 having an inductor 14, a diode 16 and a capacitor 18. A DC input voltage Vin is converted to a DC output voltage Vo, which can energize a load 20. A switching element 22 is coupled to the boost circuit 12 to determine the output voltage Vo. A control circuit 24 receives feedback from the load and uses this information to control operation of the switching element 22.

In fixed frequency DC-DC converters, power switching occurs at a constant frequency and results in radiated emissions concentrated at harmonics of the switching frequency, making it difficult to pass EMI requirements. In one known technique, in order to spread out the emitted power, the switching frequency is slightly changed in a random (or typically pseudo-random) fashion. Since the frequency is deviated by a small amount (e.g., +/−10%), the DC-DC converter maintains proper fixed-frequency operation and the emitted power is spread over a wider frequency span.

BRIEF DESCRIPTION OF THE DRAWINGS

The foregoing features of this invention, as well as the invention itself, may be more fully understood from the following description of the drawings in which.

SUMMARY

Figure 1:
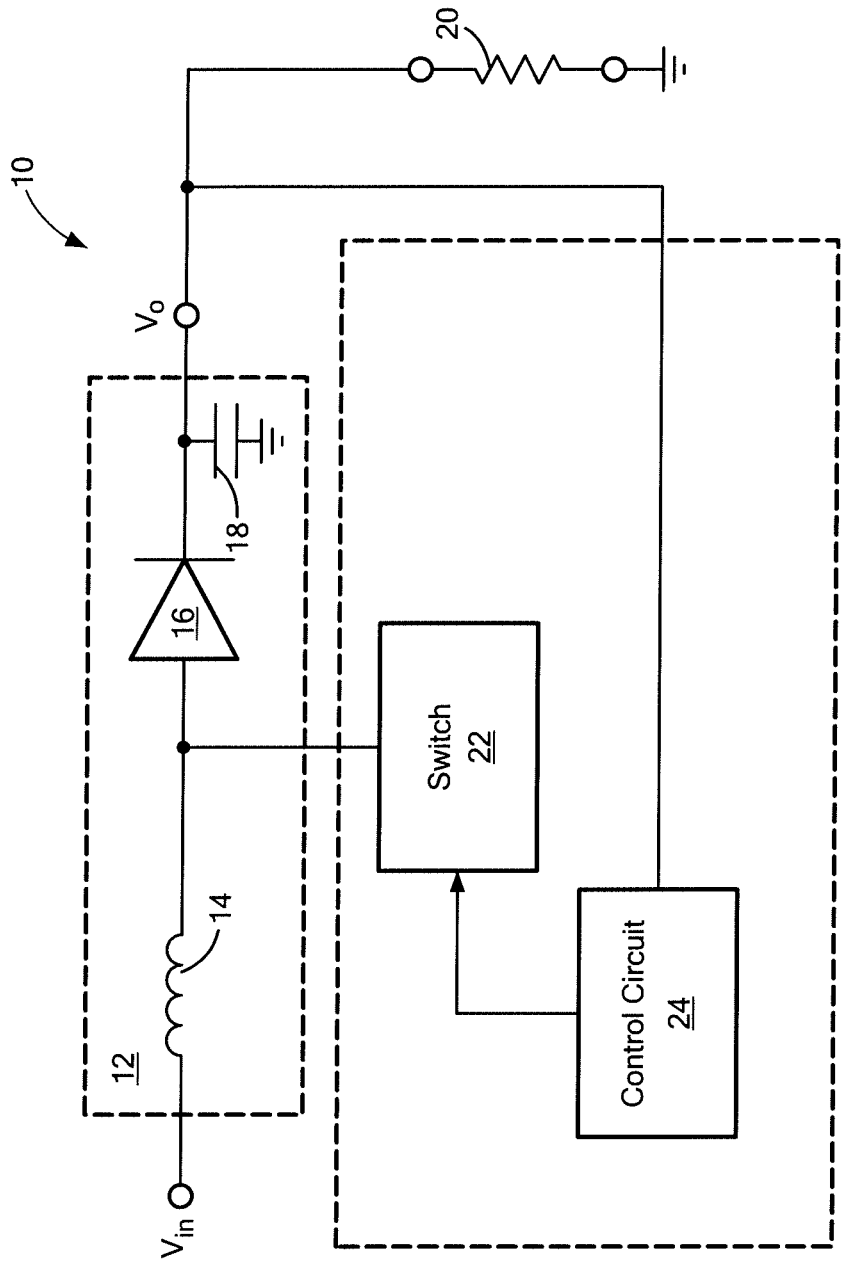
FIG. 1 is a schematic diagram of a prior art DC-DC converter.

In one aspect of the invention, a circuit comprises: a DC-DC converter comprising: a boost converter to provide a DC voltage output from a DC input voltage, the DC output voltage configured to connect with a first load terminal, a feedback module configured to connect with a second load terminal, a switching module having a switching element coupled to the boost converter, and a control circuit coupled to the feedback module and to the switching module to generate a control signal to control operation of the switching element, wherein the control circuit includes a slope generator to generate a ramp signal having a slope that can vary cycle to cycle, wherein the ramp signal is initiated by a clock signal that varies cycle-to-cycle, such that the control signal for the switching element corresponds to the ramp signal, wherein the switching element has a duty cycle that varies cycle to cycle and a duty cycle on-time that varies cycle to cycle.

The circuit can further include one or more of the following features: the DC-DC converter comprises a voltage-mode converter, the DC-DC converter comprises a current-mode converter, the control circuit includes a pulse-width modulation circuit, the control circuit includes a comparator having an output coupled to the switching element, the comparator is configured to receive the ramp signal, the control circuit includes a current source to determine the slope of the ramp signal, the control circuit includes a capacitor that is charged by the current source, the capacitor discharges upon reaching a first voltage level, and/or a conversion range of the DC-DC converter is set by a maximum and minimum controllable duty cycle.

In another aspect of the invention, a method comprises: employing a DC-DC converter having a boost converter to provide a DC voltage output from a DC input voltage, the DC output voltage configured to connect with a first load terminal, employing a feedback module to connect with a second load terminal, employing a switching module having a switching element coupled to the boost converter, employing a control circuit coupled to the feedback module and to the switching module to control operation of the switching element, generating a ramp signal in the control circuit, the ramp signal having a slope that varies cycle to cycle, wherein the ramp signal is initiated by a clock signal that varies cycle-to-cycle, such that the control signal for the switching element corresponds to the ramp signal, wherein the switching element has a duty cycle that varies cycle to cycle and a duty cycle on-time that varies cycle to cycle.

The method can further include one or more of the following features: the DC-DC converter comprises a voltage-mode converter, the DC-DC converter comprises a current-mode converter, the control circuit includes a pulse-width modulation circuit, the control circuit includes a comparator having an output coupled to the switching element, the comparator is configured to receive the ramp signal, the control circuit includes a current source to determine the slope of the ramp signal, the control circuit includes a capacitor that is charged by the current source, the capacitor discharges upon reaching a first voltage level, and/or a conversion range of the DC-DC converter is set by a maximum and minimum controllable duty cycle.

DETAILED DESCRIPTION

Before describing exemplary embodiments of the invention, some information is provided. In a voltage mode converter, the feedback network has a compensation node that determines the duty cycle of the converter. In a typical implementation, the compensation node sets the duty cycle indirectly by controlling the on-time or off-time of the converter. In a typical implementation, dithering will change the frequency of the oscillator but it will not change the on-time or off-time as set by the compensation node. This results in a duty cycle variation when dithering is employed and reduces the maximum (or minimum) effective duty cycle at which the converter can be operated.

Figure 2:
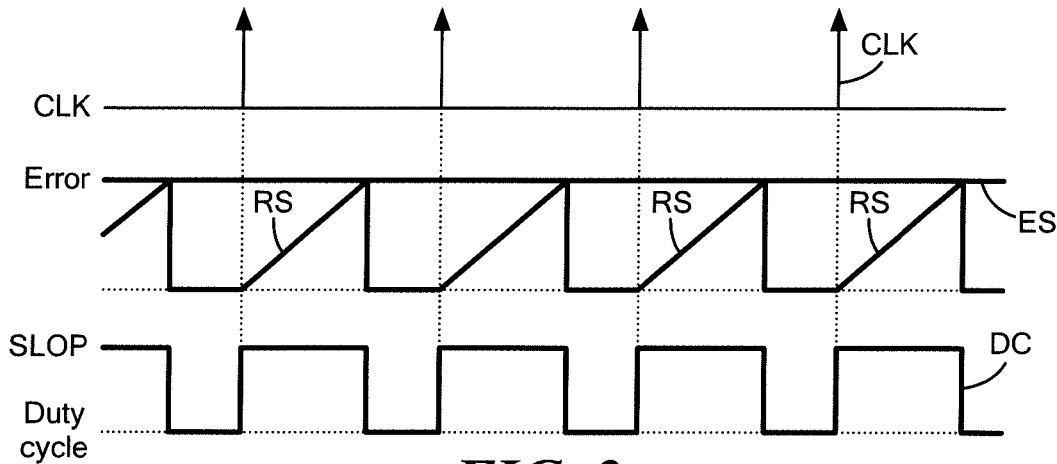
FIG. 2 is a diagram of signals for a prior art DC-DC converter with no dithering.

FIG. 2 shows signals for a conventional boost converter without dithering. A duty cycle DC of a switching element is determined by a slope signal SLOP having a series of ramps RS. The duty cycle DC is determined by the time at which the ramp signal RS begins to rise (due to the clock signal) and the time at which the ramp reaches the voltage level defined by the error signal ES. As can be seen, the duty cycle begins at the same time each cycle, as defined by the clock signal CLK, and ends at the same time each cycle, and thus has the same duration each cycle.

Figure 3:
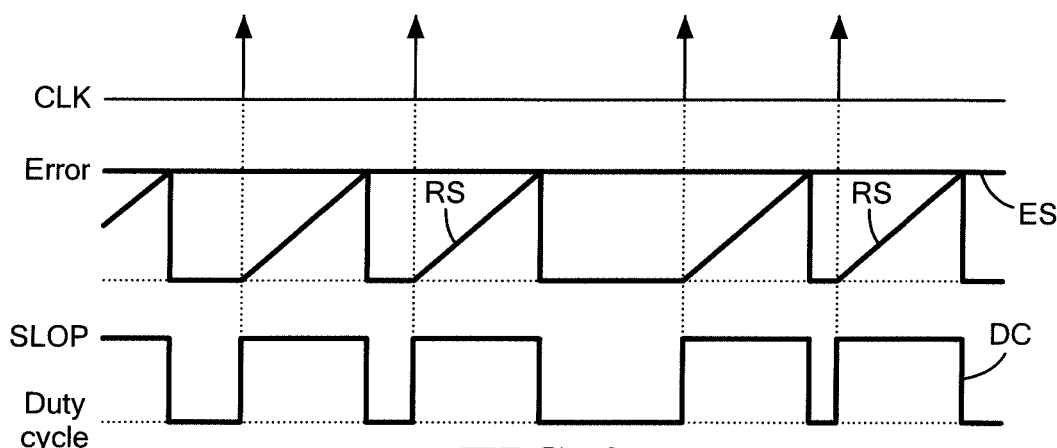
FIG. 3 is a diagram of signals for a prior art DC-DC converter with boost dithering with a variable switching frequency, fixed slope and variable boost duty cycle.

FIG. 3 shows signals for a further conventional boost converter with variable switching frequency. As can be seen, the clock signal CLK varies each cycle, which moves the beginning of the duty cycle DC. However, the duty cycle has the same duration each cycle.

The signal relationships shown in FIGS. 2 (no dithering) and 3 (dithering fixed on time conditions) above can have adverse consequences including:

The duty cycle sets the output voltage. Varying the duty cycle at the dithering rate results in the dithering showing up as a voltage waveform on the output.

The off-time (or on-time, depending on the dithering approach) varies more when the duty cycle is not preserved. This results in more dynamic range being used up for dithering, resulting in less dynamic range for the regulation requirements.

In one aspect of the invention, dithering is applied to slope-compensation to improve EMI performance as compared to prior art DC-DC converters. The advantages in enhanced EMI performance will be readily apparent to one of ordinary skill in the art.

Figure 4:
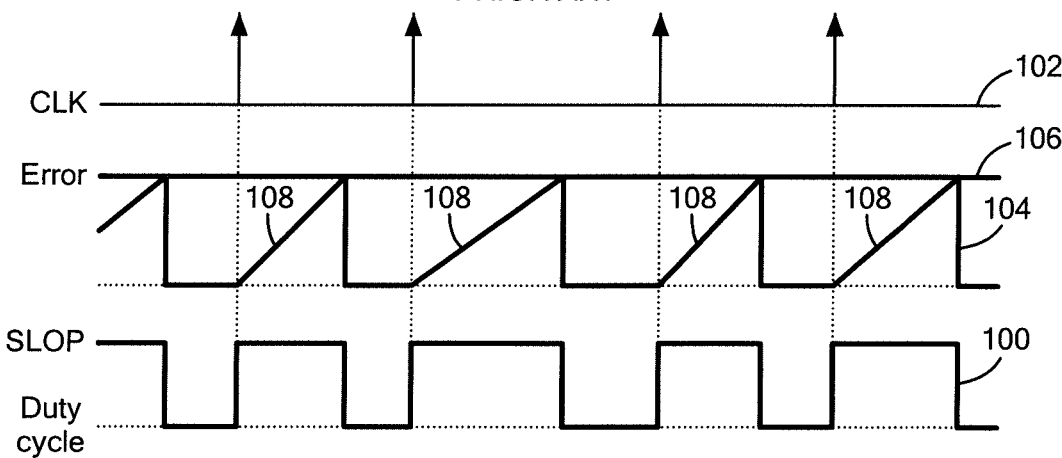
FIG. 4 is a diagram of signals for a DC-DC converter with a variable switching frequency, variable slope and fixed boost duty cycle in accordance with exemplary embodiments of the invention.

FIG. 4 shows signal waveforms for dithering fixed duty cycle of a switching element in a DC-DC converter accordance with exemplary embodiments of the invention. As can be seen, the duty cycle 100 of the control signal that controls the switching element in the DC-DC converter varies from cycle to cycle as does the duty cycle on-time, i.e., the time at which the control signal transitions to the active state. The clock signal 102 varies cycle to cycle, which moves the time at which the ramp signal 104 begins to rise until reaching the voltage level defined by the error signal 106. In one embodiment, a capacitor discharges when the voltage level defined by the error signal is reached. The slope 108 of the ramp signal 104 varies cycle to cycle, which alters the duty cycle 100. With this arrangement, EMI performance is improved as compared to conventional configurations.

Figure 5:
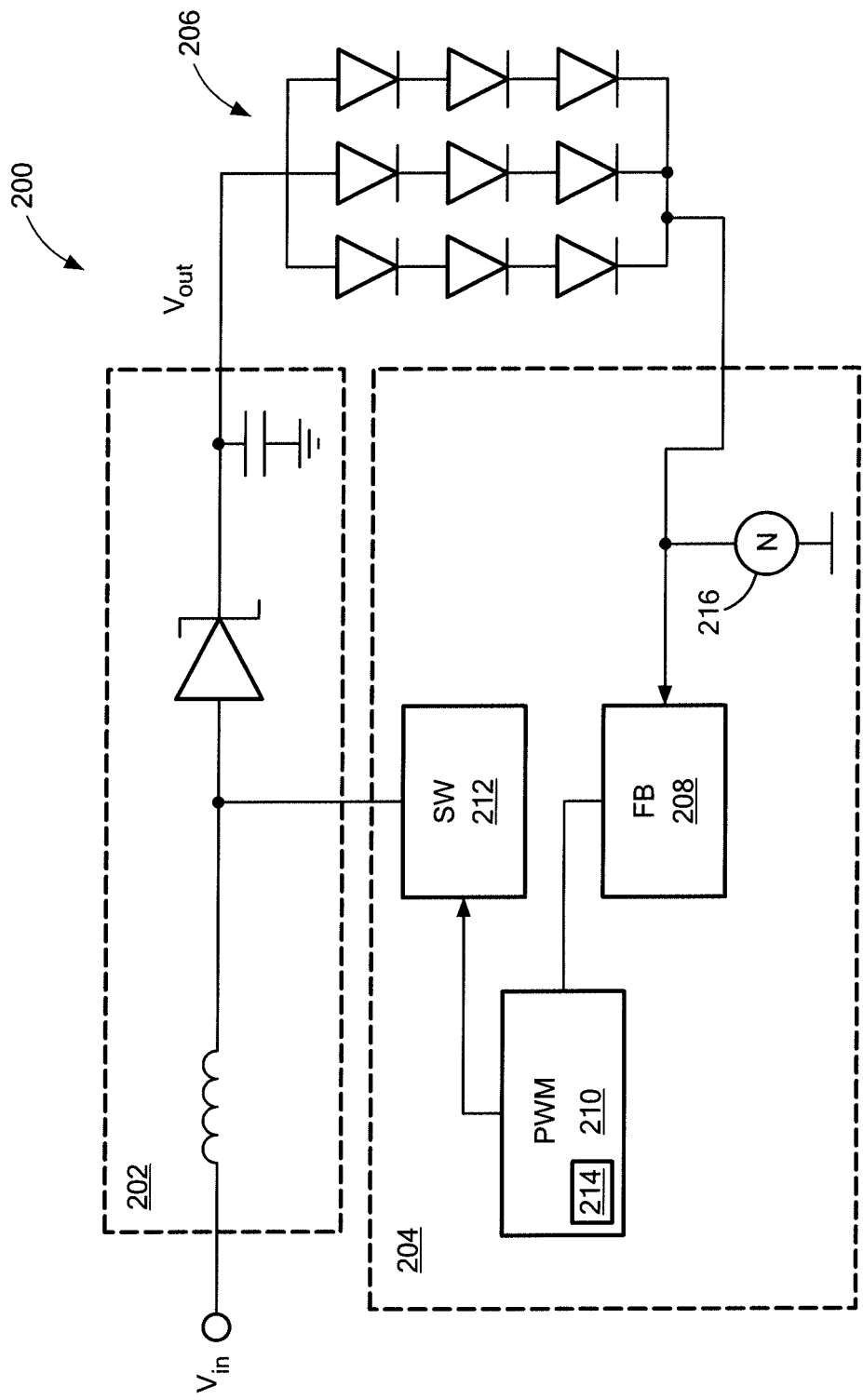
FIG. 5 is a schematic representation of a DC-DC converter with light emitting diode as a load and an internal current sink with variable switching frequency, variable slope and fixed boost duty cycle in accordance with exemplary embodiments of the invention.

FIG. 5 shows an exemplary voltage-mode DC-DC converter 200 with dithering fixed duty cycle in accordance with exemplary embodiments of the invention. The converter 200 includes a switching regulator 202, shown as a boost switching regulator circuit, coupled to an integrated circuit 204. A load 206, such as a series of LEDs, is coupled to the voltage output of the switching regulator 202. The integrated circuit 204 includes a feedback circuit 208, coupled to the load 206. The feedback circuit 208 is coupled to a pulse width modulation (PWM) circuit 210 that controls a switch 212 coupled to the switching regulator 202. The pulse width modulation circuit 210 includes a dithering circuit 214 to provide dithering fixed duty cycle. Driver 216 fixes the voltage to regulate the load 206, such as the LEDs. This fixed voltage is the regulation voltage for the feedback circuit 208, which checks the error at the fixed voltage (feedback voltage) and adjusts the duty cycle in the PWM controller 214. It is understood that any suitable switching regulator circuit can be used to meet the needs of a particular application. It is understood that any type of suitable modulation can be used.

Figure 5A:
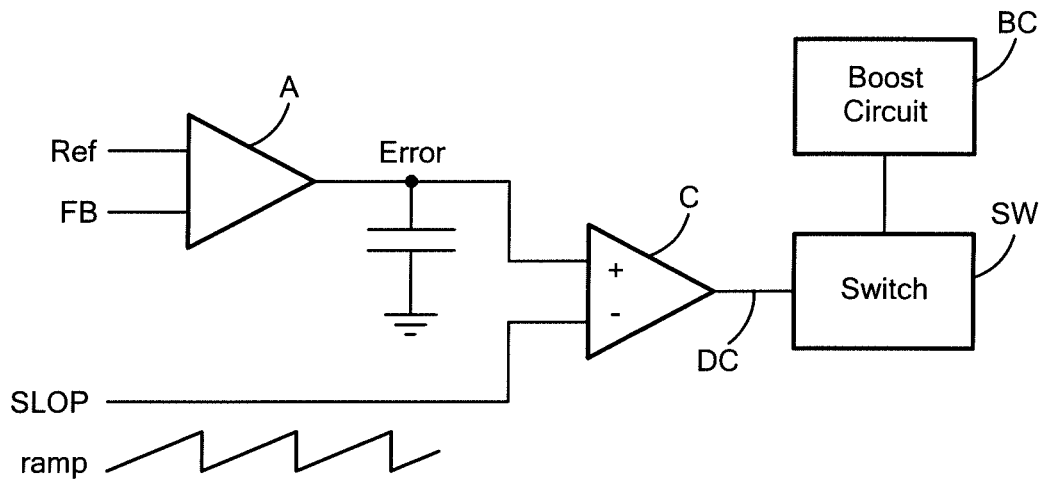
FIG. 5A is a schematic representation of circuitry to generate a duty cycle signal for a switching element.

FIG. 5A shows an exemplary circuit to generate a control signal DC for the switch SW to control the duty cycle of the switch. A reference voltage Ref and a load feedback signal FB are provided to an amplifier A that outputs an error signal, which is provided to a comparator C. A ramp signal SLOP (see FIG. 4) is also provided to the comparator C, which generates the duty cycle signal DC to control the switch SW and boost circuit BC. As described above, the slope of the ramp signal SLOP can vary. When the ramp signal SLOP exceeds the voltage threshold defined by the error signal, the control signal DC for the switch transitions, e.g., turns the switch to the inactive state.

Figure 5B:
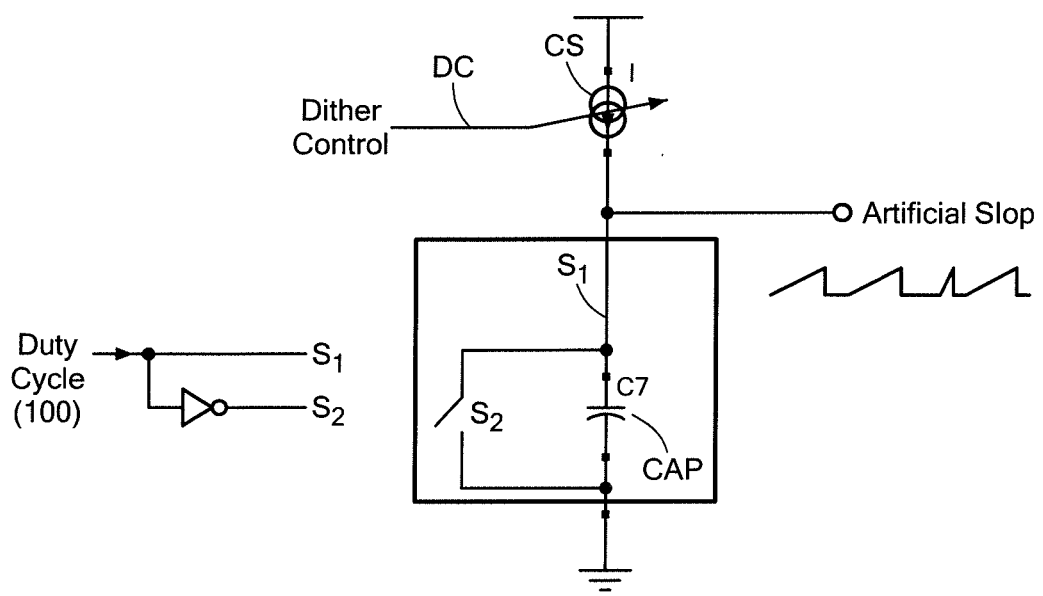
FIG. 5B is a schematic representation of circuitry to generate a variable slope signal.

FIG. 5B shows an exemplary circuit to generate the SLOP signal of FIG. 4. A dither control signal DC controls an amount of current at a current source CS to determine a slope of a ramp signal. A clock signal controls a charging circuit that enables current from the current source CS to increase the voltage on a capacitor CAP. At a rising clock transition, voltage on the capacitor CAP increases until reaching the level defined by an error signal, which discharges the capacitor CAP. During dithering current at CS will change dynamically to accommodate the dither frequency. This arrangement allows the voltage across the capacitor CAP to remain the same at the end of the charging cycle irrespective of the dither rate.

One advantage of dithering in accordance with exemplary embodiments of the invention is that the conversion range of the DC-DC converter is not affected when dithering is used. The conversion range is set by the maximum and minimum controllable duty cycle.

While exemplary embodiments of the invention are shown and described herein having particular configurations, components and applications, it is understood that embodiment of the invention are applicable to any application in which it is desirable to provide dithering for a frequency that is dependent upon a current.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A circuit, comprising:
   a DC-DC converter comprising:
   a boost converter to provide a DC voltage output from a DC input voltage, the DC output voltage configured to connect with a first load terminal;
   a feedback module configured to connect with a second load terminal;
   a switching module having a switching element coupled to the boost converter; and
   a control circuit coupled to the feedback module and to the switching module to generate a control signal to control operation of the switching element for a single mode of operation of the switching element, wherein the control circuit includes a slope generator to generate a ramp signal having a slope that varies cycle to cycle, wherein the ramp signal is initiated by a non-periodic clock signal that varies cycle-to-cycle, such that the control signal for the switching element corresponds to the ramp signal, wherein the switching element has a duty cycle that varies cycle to cycle and a duty cycle on-time that varies cycle to cycle.

2. The circuit according to claim 1, wherein the DC-DC converter comprises a voltage-mode converter.

3. The circuit according to claim 1, wherein the DC-DC converter comprises a current-mode converter.

4. The circuit according to claim 1, wherein the control circuit includes a pulse-width modulation circuit.

5. The circuit according to claim 1, wherein the control circuit includes a comparator having an output coupled to the switching element.

6. The circuit according to claim 5, wherein the comparator is configured to receive the ramp signal.

7. The circuit according to claim 1, wherein the control circuit includes a current source to determine the slope of the ramp signal.

8. The circuit according to claim 7, wherein the control circuit includes a capacitor that is charged by the current source.

9. The circuit according to claim 8, wherein the capacitor discharges upon reaching a first voltage level.

10. The circuit according to claim 1, wherein a conversion range of the DC-DC converter is set by a maximum and minimum controllable duty cycle.

11. A method, comprising: employing a DC-DC converter having a boost converter to provide a DC voltage output from a DC input voltage, the DC output voltage configured to connect with a first load terminal; employing a feedback module to connect with a second load terminal; employing a switching module having a switching element coupled to the boost converter; employing a control circuit coupled to the feedback module and to the switching module to control operation of the switching element for a single mode of operation of the switching element; generating a ramp signal in the control circuit, the ramp signal having a slope that varies cycle to cycle, wherein the ramp signal is initiated by a non-periodic clock signal that varies cycle-to-cycle, such that the control signal for the switching element corresponds to the ramp signal, wherein the switching element has a duty cycle that varies cycle to cycle and a duty cycle on-time that varies cycle to cycle.

12. The method according to claim 11, wherein the DC-DC converter comprises a voltage-mode converter.

13. The method according to claim 11, wherein the DC-DC converter comprises a current-mode converter.

14. The method according to claim 11, wherein the control circuit includes a pulse-width modulation circuit.

15. The method according to claim 11, wherein the control circuit includes a comparator having an output coupled to the switching element.

16. The method according to claim 15, wherein the comparator is configured to receive the ramp signal.

17. The method according to claim 15, wherein the control circuit includes a current source to determine the slope of the ramp signal.

18. The method according to claim 17, wherein the control circuit includes a capacitor that is charged by the current source.

19. The method according to claim 18, wherein the capacitor discharges upon reaching a first voltage level.

20. The method according to claim 11, wherein a conversion range of the DC-DC converter is set by a maximum and minimum controllable duty cycle.

21. A circuit, comprising: a DC output voltage configured to connect with a first load terminal; a feedback module configured to connect with a second load terminal; a switching module having a switching element; and a control circuit coupled to the feedback module and to the switching module to generate a control signal to control operation of the switching element for a single mode of operation of the switching element, wherein the control circuit includes a slope generator to generate a ramp signal having a slope that varies cycle to cycle, wherein the ramp signal is initiated by a non-periodic clock signal that varies cycle-to-cycle, such that the control signal for the switching element corresponds to the ramp signal, wherein the switching element has a duty cycle that varies cycle to cycle and a duty cycle on-time that varies cycle to cycle for adjusting switching frequency based on current level.

\* \* \* \* \*